United States Patent
Xia et al.

(10) Patent No.: US 11,877,260 B2
(45) Date of Patent: Jan. 16, 2024

(54) METHOD FOR MANAGEMENT NODE TO PAGE TERMINAL DEVICE, AND MANAGEMENT NODE FOR USE IN WIRELESS COMMUNICATION NETWORK

(71) Applicant: Telefonaktiebolaget LM Ericsson (publ), Stockholm (SE)

(72) Inventors: Lei Xia, Shanghai (CN); Yan Du, Shanghai (CN)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 401 days.

(21) Appl. No.: 17/297,978

(22) PCT Filed: Dec. 19, 2018

(86) PCT No.: PCT/CN2018/121952
§ 371 (c)(1),
(2) Date: May 27, 2021

(87) PCT Pub. No.: WO2020/124404
PCT Pub. Date: Jun. 25, 2020

(65) Prior Publication Data
US 2022/0095272 A1 Mar. 24, 2022

(51) Int. Cl.
*H04W 68/02* (2009.01)
*H04W 8/18* (2009.01)
(Continued)

(52) U.S. Cl.
CPC ............ *H04W 68/02* (2013.01); *H04W 8/18* (2013.01); *H04W 8/22* (2013.01); *H04W 8/26* (2013.01)

(58) Field of Classification Search
CPC ..... H04W 68/005; H04W 68/02; H04W 8/18; H04W 8/22; H04W 8/26
See application file for complete search history.

(56) References Cited

U.S. PATENT DOCUMENTS

2009/0157417 A1* 6/2009 Bradley ............... G06Q 30/02
705/318
2015/0327112 A1* 11/2015 Kant ................. H04W 28/0215
370/230
(Continued)

FOREIGN PATENT DOCUMENTS

CN 101106823 A 1/2008
CN 101237635 A 8/2008
(Continued)

OTHER PUBLICATIONS

PCT International Search Report, dated Sep. 19, 2019, in connection with International Application No. PCT/CN2018/121952, all pages.
(Continued)

*Primary Examiner* — Siu M Lee
(74) *Attorney, Agent, or Firm* — Leffler Intellectual Property Law, PLLC

(57) ABSTRACT

The present disclosure relates to a method for a management node to page a terminal device, and a management node for use in wireless communication network. The method for a management node to page a terminal device includes: receiving a first indication about whether the terminal device shares a subscriber number with another terminal device; checking a second indication about whether the terminal device supports a circuit switching call function; receiving a paging request about the terminal device; and determining whether to respond to the paging request, based on the first indication and based on a result of the operation of checking the second indication. The success rate of the circuit switching call in the wireless communication network may be improved.

20 Claims, 7 Drawing Sheets

(51) Int. Cl.
*H04W 8/22* (2009.01)
*H04W 8/26* (2009.01)

(56) References Cited

U.S. PATENT DOCUMENTS

| | | | |
|---|---|---|---|
| 2016/0345210 | A1 | 11/2016 | Shan et al. |
| 2017/0303186 | A1 | 10/2017 | Centonza et al. |
| 2018/0359286 | A1 | 12/2018 | Keller et al. |

FOREIGN PATENT DOCUMENTS

| | | | |
|---|---|---|---|
| CN | 102106165 | A | 6/2011 |
| CN | 102469425 | A | 5/2012 |
| CN | 105636007 | A | 6/2016 |
| CN | 109040493 | A | 12/2018 |
| WO | 2011137582 | A1 | 11/2011 |

OTHER PUBLICATIONS

PCT Written Opinion, dated Sep. 19, 2019, in connection with International Application No. PCT/CN2018/121952, all pages.

3GPP TS 24.301, V14.8.0, Jun. 2018, 3rd Generation Partnership Project; Technical Specification Group Core Network and Terminals; Non-Access-Stratum (NAS) protocol for Evolved Packet System (EPS); Stage 3, Release 14, 492 pages.

3GPP TS 29.272, V14.7.0, Mar. 2018, 3rd Generation Partnership Project; Technical Specification Group Core Network and Terminals; Evolved Packet System (EPS); Mobility Management Entity (MME) and Serving GPRS Support Node (SGSN) related interfaces based on Diameter protocol, Release 14, 165 pages.

3GPP TS 29.118, V14.2.0, Dec. 2017, 3rd Generation Partnership Project; Technical Specification Group Core Network and Terminals; Mobility Management Entity (MME)—Visitor Location Register (VLR) SGs interface specification, Release 14, 77 pages.

European Communication dated Nov. 24, 2021 in connection with European Application No. 18943491.3, 20 pages.

3GPP TSG-RAN5 Meeting #79, R5-182996, Busan, South Korea, May 21-25, 2018, "Correction to several LTE and LTE <> IRAT test cares for IMS disabled over UMTS", 101 pages.

3GPP TR 23.772 V1.0.0 (Nov. 2014), 3rd Generation Partnership Project; Technical Support Group Services and System Aspects; Enhanced Circuit Switched (CS) Fallback (Release 13), 44 pages.

Chinese office action dated May 15, 2023 in connection with Chinese Application No. 201880100309.4, 6 pages.

\* cited by examiner

| Information element name | Mapping to Diameter AVP | Cat. | Description |
|---|---|---|---|
| Supported Features (See 3GPP TS 29.229 [9]) | Supported-Features | O | If present, this information element shall contain the list of features supported by the origin host. |
| Result (See 7.4) | Result-Code / Experimental-Result | M | This IE shall contain the result of the operation.<br>The Result-Code AVP shall be used to indicate success / errors as defined in the Diameter Base Protocol.<br>The Experimental-Result AVP shall be used for S6a/S6d errors. This is a grouped AVP which shall contain the 3GPP Vendor ID in the Vendor-Id AVP, and the error code in the Experimental-Result-Code AVP.<br>The following errors are applicable:<br>- User Unknown<br>- Unknown EPS Subscription<br>- RAT Not Allowed<br>- Roaming Not Allowed |
| Error-Diagnostic | Error-Diagnostic | O | If the Experimental Result indicates "Unknown EPS Subscription", Error Diagnostic may be present to indicate whether or not GPRS subscription data are subscribed (i.e. whether or not Network Access Mode stored in the HSS indicates that only circuit service is allowed).<br><br>If the Experimental Result indicates "Roaming Not Allowed", and the Update Location is rejected due to ODB, Error Diagnostic may be present to indicate the specific type of ODB. |
| ULA-Flags (See 7.3.8) | ULA-Flags | C | This Information Element contains a bit mask. See 7.3.8 for the meaning of the bits. It shall be present only when the Result-Code AVP is DIAMETER_SUCCESS. |
| Subscription Data (See 7.3.2) | Subscription-Data | C | This Information Element shall contain the complete subscription profile of the user. It shall be present if success is reported, unless an explicit "skip subscriber data" indication was present in the request. |
| Reset-IDs (See 7.3.184) | Reset-ID | O | The Reset-ID uniquely identifies a fallible resource in the HSS on which the user (IMSI) depends. In the event of a restart of the fallible resource a Reset message containing the Reset-ID will exactly identify the impacted subscribers. |
| Device Type | Device Type | C | This Information Element shall contain which kind of UE type is: ultra card UE or normal UE.<br>It may be present only when the Result-Code AVP is DIAMETER_SUCCESS. |

METHOD FOR MANAGEMENT NODE TO PAGE TERMINAL DEVICE, AND MANAGEMENT NODE FOR USE IN WIRELESS COMMUNICATION NETWORK

TECHNICAL FIELD

The present disclosure relates generally to the technology of wireless communication, and in particular, to a method for a management node to page a terminal device, and a management node for use in a wireless communication network.

BACKGROUND

In a communication network, a voice call from a terminal device to another may be implemented through a circuit switching domain, which establishes a stable, exclusive physical communication path for the talking terminal devices. The terminal device may be any kind of user equipment (UE) supporting the circuit switching function, such as a mobile phone.

As a preparation to establish the physical communication path, a mobile switching node request a management node, such as a mobility management entity (MME), to page the target terminal device. The target terminal device is identified by mobile switching node using a specified subscriber number, such as a Mobile Station International Subscriber Directory Number (MSISDN), i.e., a mobile phone number.

According to improvement of various services for users in recent years, one MSISDN may be shared with different terminal devices. These terminal devices may be further identified using other numbers, such as different international mobile subscriber identification (IMSI) numbers. However, when an original terminal device calls for a phone number, no information about IMSI can be simultaneously provided to the mobile switching node. Thus, it is hard to directly choose an applicable target terminal device from different target terminal devices with the same MSISDN, and the failure rate of the voice call increases, when an inapplicable terminal device is to be paged.

SUMMARY

Certain aspects of the present disclosure and their embodiments may provide solutions to these or other challenges. There are, proposed herein, various embodiments which address one or more of the issues disclosed herein.

A first aspect of the present disclosure provides a method for a management node to page a terminal device, comprising: receiving a first indication about whether the terminal device shares a subscriber number with another terminal device; checking a second indication about whether the terminal device supports a circuit switching call function; receiving a paging request about the terminal device; and determining whether to respond to the paging request, based on the first indication and based on a result of the operation of checking the second indication.

In embodiments of the present disclosure, determining whether to respond to the paging request comprises: determining not to respond to the paging request, if the first indication shows that the terminal device shares the subscriber number with another terminal device, and the result of the operation of checking the second indication shows that the terminal device does not support the circuit switching call function.

In embodiments of the present disclosure, determining whether to respond to the paging request comprises: determining to respond to the paging request, if the first indication shows that the terminal device shares the subscriber number with another terminal device, and the result of the operation of checking the second indication shows that the terminal device supports the circuit switching call function.

In embodiments of the present disclosure, determining whether to respond to the paging request comprises: determining to respond to the paging request, if the first indication shows that the terminal device does not share the subscriber number with another terminal device.

In embodiments of the present disclosure, the method further comprises: determining whether to page the terminal device, based on the result of the operation of checking the second indication.

In embodiments of the present disclosure, determining whether to page the terminal device comprises at least one of: determining to page the terminal device, if the result of the operation of checking the second indication shows that the terminal device supports the circuit switching call function; and determining not to page the terminal device, if the result of the operation of checking the second indication shows that the terminal device does not support the circuit switching call function.

In embodiments of the present disclosure, a response to the paging request comprises at least one of: reject response, if the first indication shows that the terminal device does not share the subscriber number with another terminal device, and the result of the operation of checking the second indication shows that the terminal device does not support the circuit switching call function; and a success response, if the result of the operation of checking the second indication shows that the terminal device supports the circuit switching call function, and the terminal device accepts paging from the management node.

In embodiments of the present disclosure, the first indication is received from a subscriber server.

In embodiments of the present disclosure, the first indication is received through an update location answer during an update location procedure.

In embodiments of the present disclosure, the update location answer comprises a first information element as the first indication. The first information element comprises: a value of "Ultra Card User Equipment", indicating that the terminal device shares the subscriber number with another terminal device; or a value of "Normal User Equipment", indicating that the terminal device does not share the subscriber number with another terminal device.

In embodiments of the present disclosure, the second indication is determined, based on an information element "additional update type" of the terminal device, and a circuit-switched fallback (CSFB) configuration of the management node.

In embodiments of the present disclosure, the information element "additional update type" of the terminal device is received from the terminal device, through a combined attach/TAU request message during a combined attach/TAU procedure, wherein the TAU refers to tracking area update.

In embodiments of the present disclosure, if the information element "additional update type" has a value of "SMS only", and/or the CSFB configuration of the management node is "CSFB switch off", the second indication with a value of "SMS only" is determined, to show that the terminal device does not support a circuit switching call function.

In embodiments of the present disclosure, an absence of the second indication indicates that the terminal device supports a circuit switching call function.

In embodiments of the present disclosure, the paging request is received from a mobile switching node.

In embodiments of the present disclosure, the subscriber number comprises: a mobile station international subscriber directory number (MSISDN). Terminal devices sharing the same subscriber number have different international mobile subscriber identification (IMSI) numbers.

In embodiments of the present disclosure, the management node comprises a mobility management entity. The terminal device comprises a user equipment.

A second aspect of the present disclosure provides a management node for use in a wireless communications network, the management node comprising: a processor; and a memory, containing instructions executable by the processor. The management node is operative to: receive a first indication about whether the terminal device shares a subscriber number with another terminal device; check a second indication about whether the terminal device supports a circuit switching call function; receive a paging request about the terminal device; and determine whether to respond to the paging request, based on the first indication and based on a result of the operation of checking the second indication.

In embodiments of the present disclosure, the management node is operative to determine not to respond to the paging request, if the first indication shows that the terminal device shares the subscriber number with another terminal device, and the result of checking the second indication shows that the terminal device does not support the circuit switching call function to determine.

In embodiments of the present disclosure, the management node is operative to determine to respond to the paging request, if the first indication shows that the terminal device shares the subscriber number with another terminal device, and the result of the operation of checking the second indication shows that the terminal device supports the circuit switching call function.

In embodiments of the present disclosure, the management node is operative to determine to respond to the paging request, if the first indication shows that the terminal device does not share the subscriber number with another terminal device.

In embodiments of the present disclosure, the management node is further operative to determine whether to page the terminal device, based on the result of checking the second indication.

In embodiments of the present disclosure, the management node is further operative to: determine to page the terminal device, if the result of checking the second indication shows that the terminal device supports the circuit switching call function; and determine not to page the terminal device, if the result of checking the second indication shows that the terminal device does not support the circuit switching call function.

In embodiments of the present disclosure, a response to the paging request comprises at least one of: reject response, if the first indication shows that the terminal device does not share the subscriber number with another terminal device, and the result of checking the second indication shows that the terminal device does not support the circuit switching call function; and success response, if the result of checking the second indication shows that the terminal device supports the circuit switching call function, and the terminal device accepts paging from the management node.

In embodiments of the present disclosure, the management node is operative to receive the first indication from a subscriber server.

In embodiments of the present disclosure, the management node is operative to receive the first indication through an update location answer during an update location procedure.

In embodiments of the present disclosure, the update location answer comprises a first information element as the first indication; and wherein the first information element comprises: a value of "Ultra Card User Equipment", indicating that the terminal device shares the subscriber number with another terminal device; or a value of "Normal User Equipment", indicating that the terminal device does not share the subscriber number with another terminal device.

In embodiments of the present disclosure, the management node is operative to determine the second indication based on an information element "additional update type" of the terminal device, and a circuit-switched fallback (CSFB) configuration of the management node.

In embodiments of the present disclosure, the information element "additional update type" of the terminal device is received from the terminal device, through a combined attach/TAU request message during a combined attach/TAU procedure, wherein the TAU refers to tracking area update.

In embodiments of the present disclosure, an absence of the second indication indicates that the terminal device supports a circuit switching call function.

In embodiments of the present disclosure, the management node is operative to perform the method described above.

A third aspect of the present disclosure provides a computer readable storage medium having a computer program stored thereon, the computer program executable by a device to cause the device to carry out the method described above.

BRIEF DESCRIPTION OF DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 6 is a table showing information elements (IE) in an update location answer in accordance with embodiments of the present disclosure;

DETAILED DESCRIPTION

Figure 1:
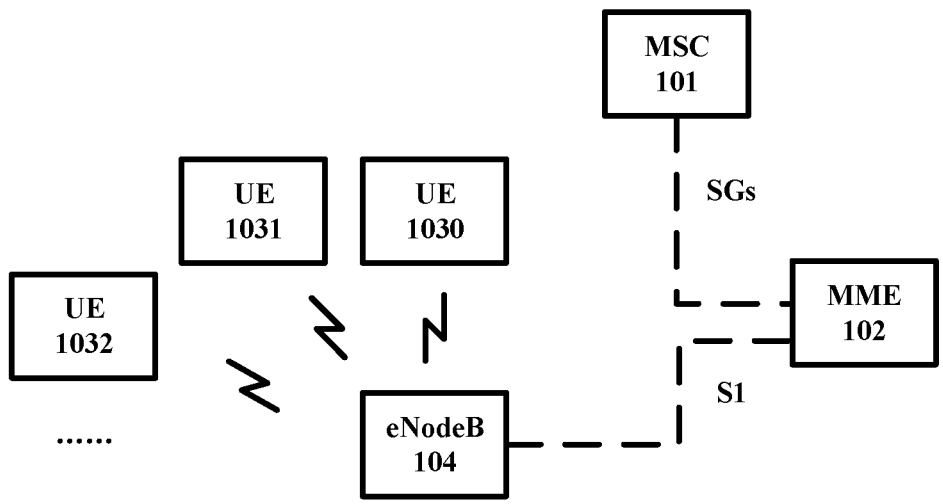
FIG. 1 is an exemplary block diagram showing network nodes to implement circuit switching services for a terminal device.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network", or "communication network/system" refers to a network/system following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" or "network side node" refers to a network device with accessing function in a communication network via which a terminal device accesses to the network and receives services therefrom. The network node may include a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

Further, term "network node" or "network side node" may also refer to a network device with core network function. The network node may refer to a mobility management entity (MME), or a mobile switching center (MSC).

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specifical example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on".

The term "one embodiment" and "an embodiment" are to be read as "at least one embodiment". The term "another embodiment" is to be read as "at least one other embodiment". Other definitions, explicit and implicit, may be included below.

FIG. 1 is an exemplary block diagram showing network nodes to implement circuit switching services for a terminal device.

Without limitation to the present disclosure, as a specific example in a 3rd generation partner project (3GPP) communication system, the mobile switching node may be a mobile switching center (MSC) 101, the management node may be a mobility management entity (MME) 102, and the terminal device may be a user equipment, such as UE 1030, UE 1031, or UE 1032, etc. SGs is an interface between the MSC 101 and the MME 102. S1 is an interface between the MME 102 and a base station, such as an evolved node B, eNodeB 104.

A voice call support could be a typical use case of circuit switching communication service for accessing CS domain. Such circuit switching function is a circuit switching voice call function. The interface SGs, connecting the MSC/VLR and the MME/SGSN, is used for a registration of the UE in the MSC/VLR by performing combined procedures, to page the UE on behalf of the MSC/VLR, and to convey CS-related services. By using interface SGs, the CS call could fall back to WCDMA and GSM to perform voice calls for a UE initially connected to EPS. VLR is visitor location register, SGSN is serving general packet radio service support node, WCDMA is wideband code division multiple access, and GSM is global system for mobile communication. EPS is evolved packet system.

For multiple mobile devices with different subscriber identification module (SIM) cards (i.e. different IMSI) but the same MSISDN, when there is a mobile terminated (MT) CS call coming, according to MSISDN, MSC will send paging request to all the terminal devices owning the same MSISDN. And with the SGs interface support, MSC sends Paging Request messages for the terminal devices to MME, in which the device's IMSI is included. MME decides on sending paging to UE according to UE's CS capability. If the UE to be paged, such as an internet of things (IoT) device, only supports SMS and doesn't have CSFB capability, MME will reject this paging from MSC immediately without sending paging to UE. If then the MSC receives the paging reject from the MME before receiving a successful paging response from other UE with the same MSISDN and with CSFB capability the MT CS call will fail despite other UEs owning the same MSISDN may have the CSFB capability and can be paged for MT CS call.

Namely, a reject response from the MME to the MSC is directly generated by the MME, and a success response from the MME to the MSC needs to wait for a UE to react. Thus, in some cases, a reject response may be the first response received by the MSC even though there exists a UE with the same MSISDN that has a CS capability. In consequence, the failure rate of MT CS call rises.

Figure 2:
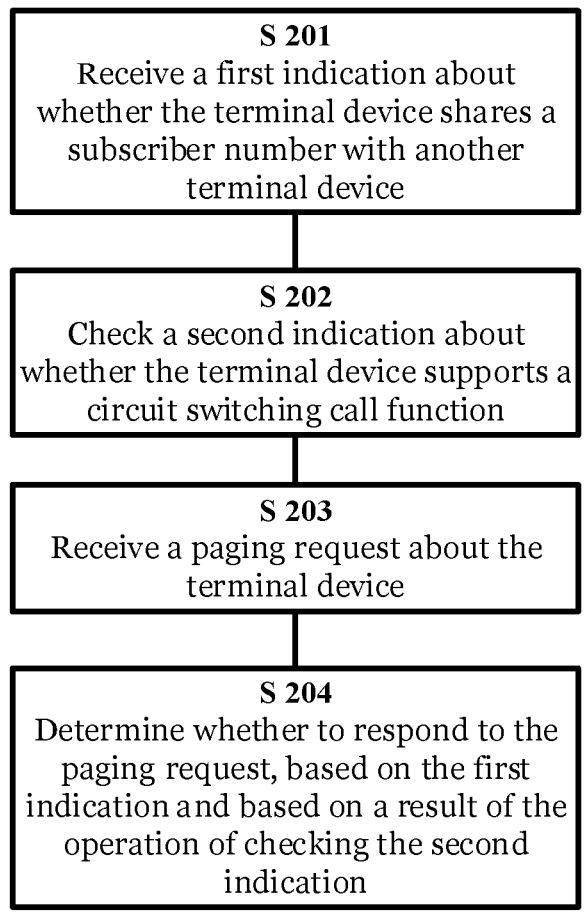
FIG. 2 is an exemplary flow chart showing a method for a management node to page a terminal device in accordance with embodiments of the present disclosure.

FIG. 2 is an exemplary flow chart showing a method for a management node to page a terminal device in accordance with embodiments of the present disclosure. As shown in FIG. 2, the method for a management node to page a terminal device includes: step S201, receiving a first indication about whether the terminal device shares a subscriber number with another terminal device; step S202, checking a second indication about whether the terminal device supports a circuit switching call function; step S203, receiving a paging request about the terminal device; and step S204, determining whether to respond to the paging request, based on the first indication and based on a result of the operation of checking the second indication.

With the usage of the first indication and the second indication, the MME obtains detailed information about the UE, such as whether the terminal device shares a subscriber number with another terminal device and whether the terminal device supports a circuit switching call function. The response to the paging request may be adjusted by the MME based on such detailed information. For example, a reject response may be further handled (e.g. delayed or suspended) before being sent to the MSC. Thus, it will be possible for the MSC to receive a success response before a reject response, when both a UE with CS capability and a UE without CS capability are paged at the same time due to the same shared subscriber number, such as MSISDN. As a result, the failure rate of MT CS call may be reduced. In one embodiment the circuit switching call function may be CSFB (circuit-switched fallback).

Figure 3:
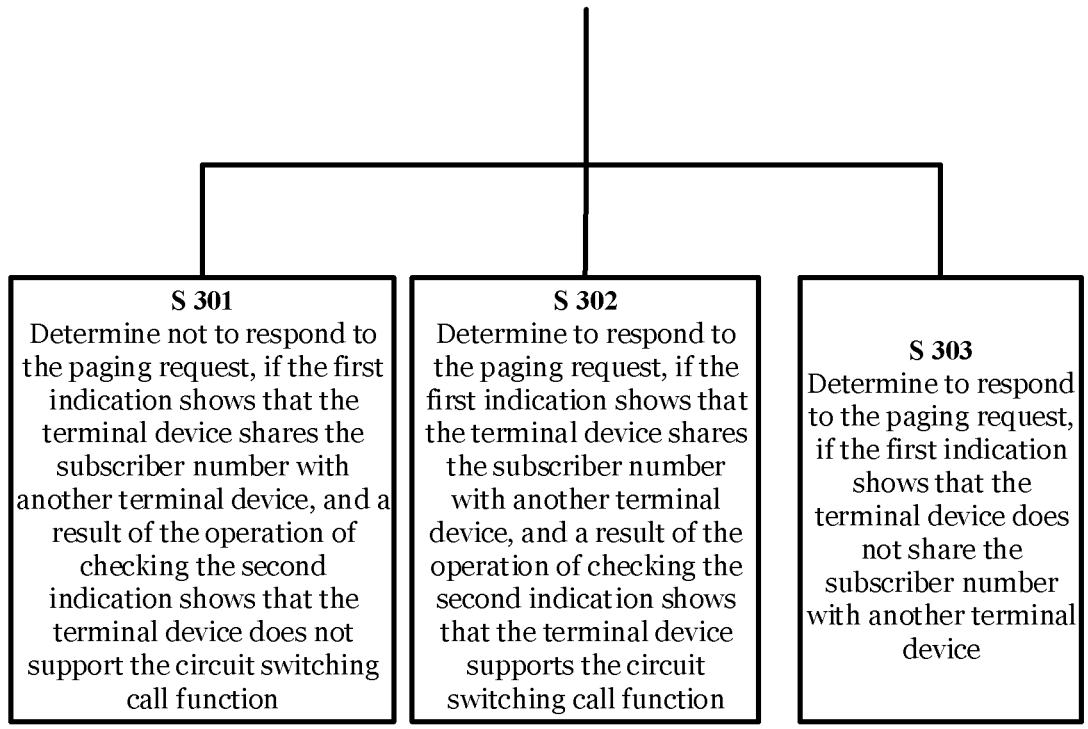
FIG. 3 is an exemplary flow chart showing exemplary substeps of method as shown in FIG. 2.

FIG. 3 is an exemplary flow chart showing exemplary substeps of the method as shown in FIG. 2. As shown in FIG. 3, the step S204 may include: step S301, determining not to respond to the paging request, if the first indication shows that the terminal device shares the subscriber number with another terminal device, and a result of the operation of checking the second indication shows that the terminal device does not support the circuit switching call function.

In state of the art solutions, when the MME finds that a UE without CS capability is going to be paged, the MME sends a reject response immediately, and then the CS call may fail. As an improvement, to address this problem, in the embodiments of the present disclosure, when the MME finds, by checking the second indication, that a UE without CS capability is going to be paged, the MME makes a determination based on the first indication. If the first indication shows that the terminal device shares the subscriber number with another terminal device, the MME determines not to respond to the paging request. In one embodiment, the paging request from the MSC is ignored. The MSC will only receive a success response related to another UE with CS capability, if it is also paged at the same time due to the same shared subscriber number, such as MSISDN. An unnecessary MT CS call fail will be avoided. In an alternative embodiment instead of ignoring the paging request from the MSC, the MME delays sending a paging reject response to the MME. The length of the delay may be implementation specific and defined by the operator. It should be long enough to allow for receiving the success response related to another UE sharing the same subscriber number and having CS capability.

See FIG. 1 again, as a specific example, UE 1030, UE 1031, UE 1032 may share the same MSISDN. UE 1030 may be a typical mobile phone supporting CS function. However, UE 1031, UE 1032 may be pad, tablet computer, or any other smart network device, which do not support the CS function, and only use the MSISDN to transmit data packet with the communication network. Such arrangement is generally applicable for a family user group or a company user group with many kinds of devices.

In embodiments of the present disclosure, the subscriber number may be a mobile station international subscriber directory number (MSISDN). Terminal devices, such as above defined UE 1030, 1031, 1032, sharing the same subscriber number may have different international mobile subscriber identification (IMSI) numbers.

When there is a MT CS call directed to the MSISDN, based on the first indications and the checking results of the second indications for UE 1030, UE 1031, and UE 1032, the MME 102 ignores the paging request to the UE 1031, 1032. Namely, the MME 102 does not generate a reject response corresponding to UE 1031, and UE 1032. The MME 102 will page the UE 1030, because as a result of the checks the MME 102 known that UE 1030 is one that shares MSISDN with other UEs and that the UE 1030 does support CSFB. Then the MME 102 will wait for the reaction of the UE 1030. Thus, the MSC 101 will only receive a success response corresponding to UE 1030 from the MME 102. The success rate of circuit switching call is obviously improved. And the bigger the number of terminal devices sharing the same MSISDN, the more obvious the improvement is.

Further, the step S204 may include step S302, determining to respond to the paging request, if the first indication shows that the terminal device shares the subscriber number with another terminal device, and the result of the operation of checking the second indication shows that the terminal device supports the circuit switching call function. Therefore, even the terminal device shares the subscriber number with another terminal device, no extra handling is needed if the terminal device supports the circuit switching call function. An efficient way to improve the success rate is provided.

Further, the step S204 may include step S303, determining to respond to the paging request, if the first indication shows that the terminal device does not share the subscriber number with another terminal device.

According to embodiments of the present disclosure, if the first indication shows that the terminal device does not share the subscriber number with another terminal device, the MME 102 needs not to further handle the response to the MSC 101 in any special way. Namely, a reject response may be generated by the MME 102 directly if the terminal device does not support CS call function, or a success response may be generated by the MME 102 if the terminal device supports CS call function and accepts the paging from the MME 102.

Therefore, according to embodiments of the present disclosure, an efficient way, without modifying the procedure in the MSC 101, is provided for improving CS call paging success rate.

Figure 4:
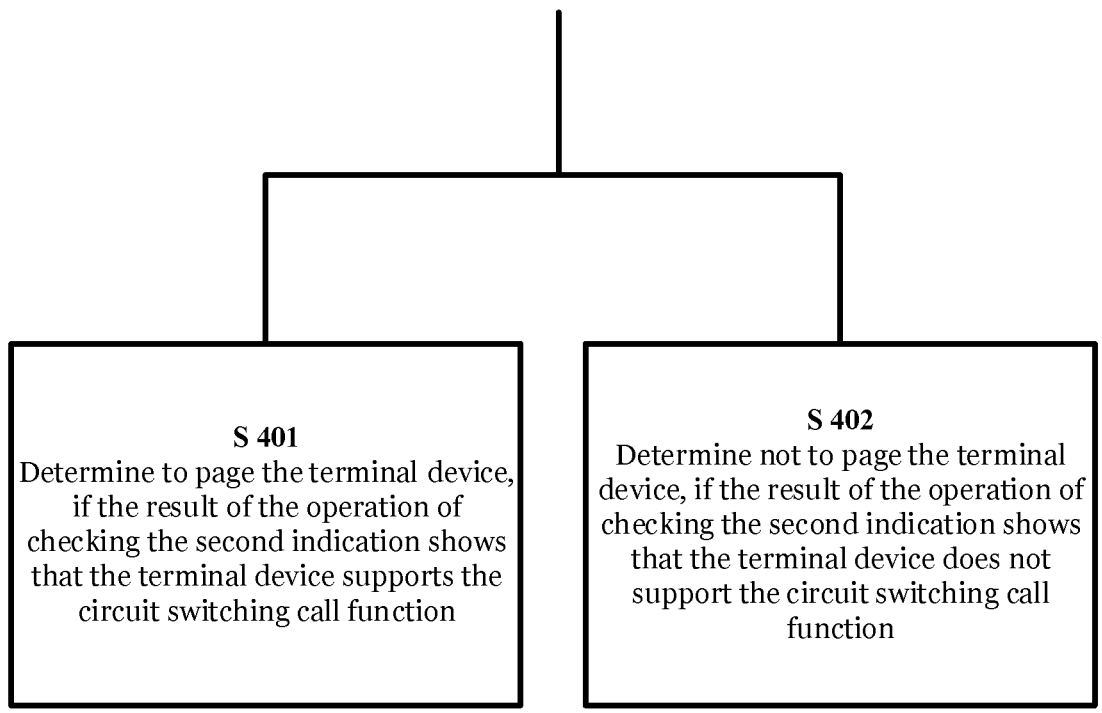
FIG. 4 is an exemplary flow chart showing other exemplary steps of method as shown in FIG. 2.

FIG. 4 is an exemplary flow chart showing other exemplary steps of method as shown in FIG. 2.

In embodiments of the present disclosure, since the second indication relates to information whether terminal device supports the circuit switching call function, the method may further include: determining whether to page the terminal device, based on the result of the operation of checking the second indication.

Further, as shown in FIG. 4, this step of determining whether to page the terminal device comprises at least one of: step S401, in which it is determined to page the terminal device, if the result of the operation of checking the second indication shows that the terminal device supports the circuit switching call function; and step S402, in which it is determined not to page the terminal device, if the result of the operation of checking the second indication shows that the terminal device does not support the circuit switching call function.

Namely, there is no need for the MME 102 to page a terminal device without CS capability, time or energy may be saved.

In embodiments of the present disclosure, a response to the paging request comprises at least one of:
a reject response, if the first indication shows that the terminal device does not share the subscriber number with another terminal device, and the result of the operation of checking the second indication shows that the terminal device does not support the circuit switching call function; and
a success response, if the result of the operation of checking the second indication shows that the terminal device supports the circuit switching call function, and the terminal device accepts paging from the management node.

Namely, the MME 102 does not specially handle the success response, no matter sharing or not the same MSISDN. And the MME 102 does not suspend the reject response (by delaying sending it or ignoring the paging request) if the terminal device does not share the subscriber number with another terminal device. No extra managing or computing cost of the MME 102 will be caused under these situations.

Figure 5:
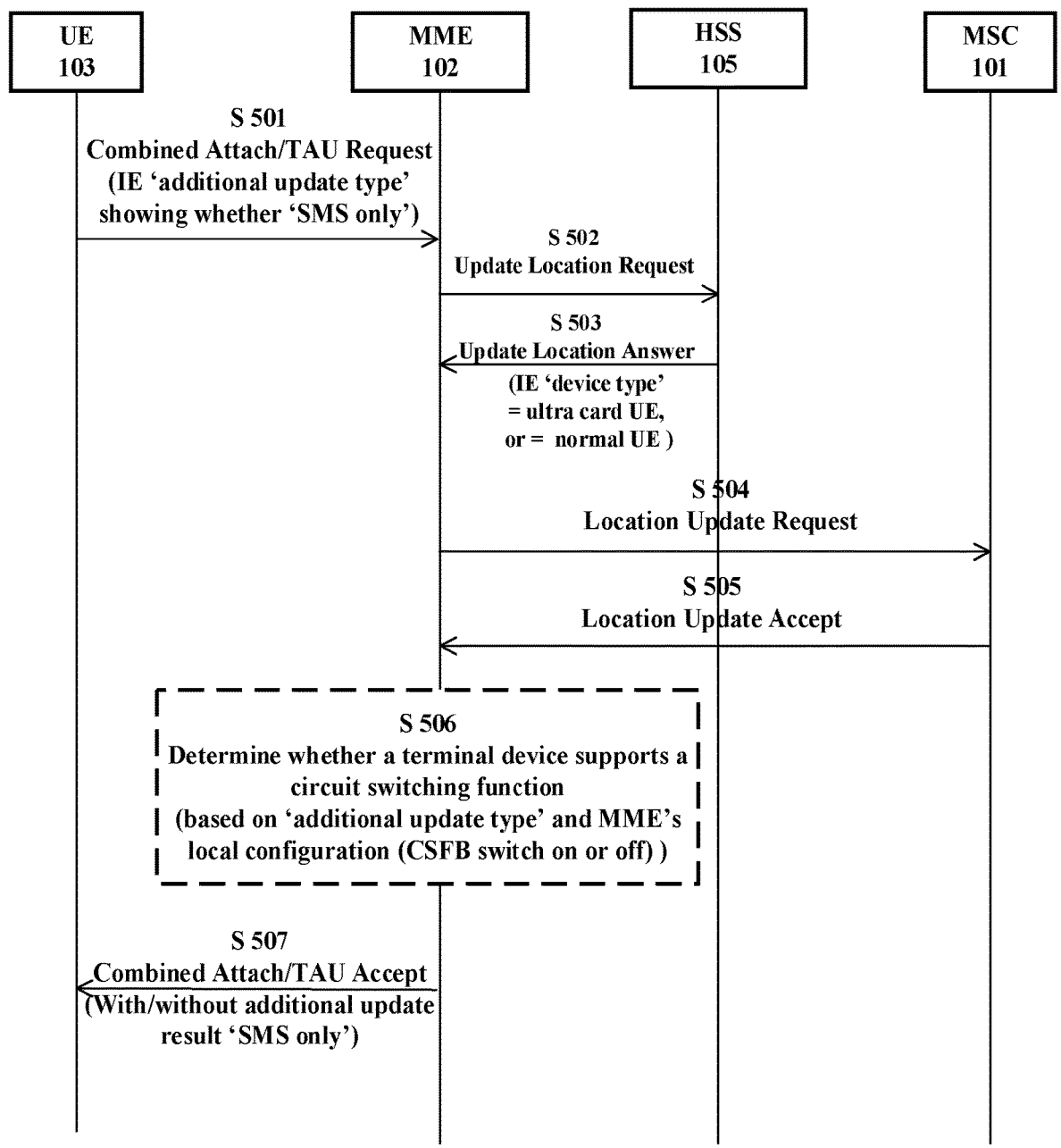
FIG. 5 is a procedure schematic showing an exemplary implementation about the first and second indications.

FIG. 5 is a procedure schematic showing an embodiment implementation about the first and second indications. As shown in FIG. 5, in step S501, a UE 103 sends a combined attach/TAU request to the MME 102. In step S502, the MME 102 sends an update location request to a subscriber server, such as a home subscriber server, HSS 105. In step S503, the HSS 105 returns an update location answer to the MME 102. In step S504, the MME 102 sends a location update request to the MSC 101, and in step S505, the MSC 101 returns a location update accept to the MME 102. In step S506, the MME 102 determines whether the UE 103 supports a circuit switching function. In step S507, the MME 102 sends combined attach/TAU accept to the UE 103. The terminal device, such as a UE, initiates Attach/TAU procedure to do the registration in both circuit switched (CS) and packet switched (PS) domains. PS registration is processed in MME for data service, while CS registration is processed in MSC through MME for CSFB and SMS. For example, the combined attach/TAU procedure may be any combined attach or tracking area updating procedure as described in a 3rd generation partnership project technical specification, 3GPP TS 24.301 V15.4.0 (2018-09).

As to the first indication, the MME 102 may receive it from the HSS 105, particularly, through an update location answer during an update location procedure, as in the step S503.

Specifically, in embodiments of the present disclosure, the update location answer comprises a first information element as the first indication. The first information element may be "device type" and comprise: a value of "Ultra Card User Equipment", indicating that the terminal device shares the subscriber number with another terminal device; or a value of "Normal User Equipment", indicating that the terminal device does not share the subscriber number with another terminal device.

As to the second indication, in S501, the information element "additional update type" of the terminal device is received from the terminal device, through a combined attach/TAU request message during a combined attach/TAU procedure, wherein the TAU refers to tracking area update. Then, as in S506, the second indication is determined, based on the information element "additional update type" of the terminal device, and a circuit-switched fallback (CSFB) configuration of the management node. Specifically, if the information element "additional update type" has a value of "SMS only", and/or the CSFB configuration of the management node is "CSFB switch off", the second indication with a value of "SMS only" is determined, to show that the terminal device does not support a circuit switching call function. Further, an absence of the second indication indicates that the terminal device supports a circuit switching call function, namely, the terminal device may use both SMS and CSFB service in the network.

With the above examples of the first and second indications, only an extra IE is needed in an existing message to transmit the first indication. Therefore, an efficient way is provided to improve CS call paging success rate. It should be understood that the specifical example is not a limitation, new message may also be used to transmit the first indication.

FIG. 6 is a table showing IEs in an update location answer in accordance with embodiments of the present disclosure.

As already illustrated in FIG. 5, an existing message of the update location answer may be used to transmit the indication form HSS 105 to MME 102, thus, no extra new message is needed. As shown in FIG. 6, the existing message of 'update location answer' is described in detail in 3rd generation partnership project technical specification, such as in 'Table 5.2.1.1.1/2' of 3GPP TS 29.272 V14.7.0 (2018-03) (Release 14).

In embodiments of the present disclosure, a first information element 'Device Type' as the first indication may be further added to the above mentioned table. Category (Cat.) of this Information Element may be conditional (C). This Information Element shall contain indication of the type of the UE: ultra card UE or normal UE. Further, it may be present only when the Result-Code AVP is DIAMETER_SUCCESS. AVP refers to Attribute-Value Pairs.

Figure 7:
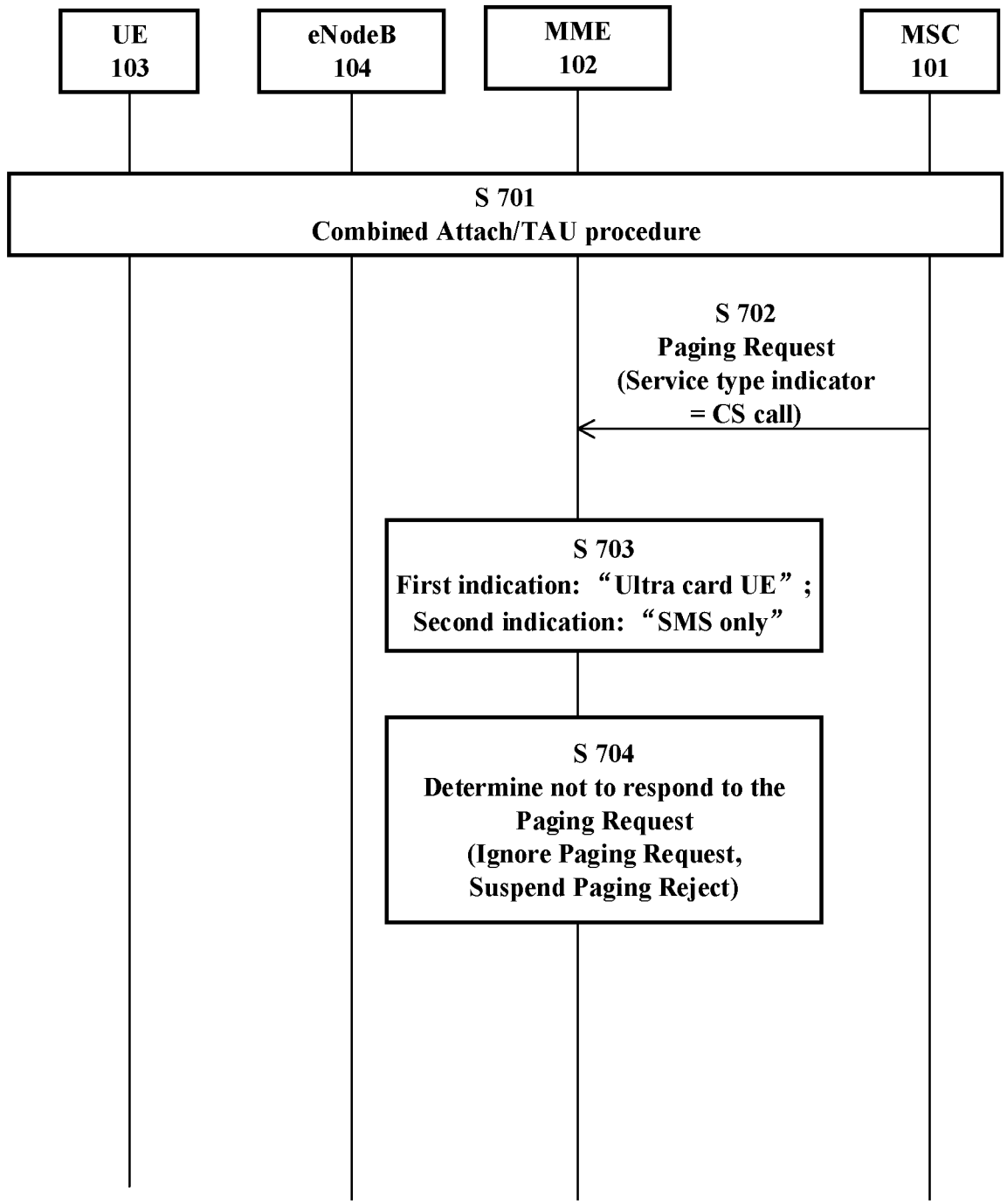
FIG. 7 is a procedure schematic showing an exemplary implementation of the method as shown in FIG. 2.

FIG. 7 is a procedure schematic showing an exemplary implementation of the method shown in FIG. 2.

As shown in FIG. 7, in step S701, a combined attach/TAU procedure of the UE 103 in the communication network is finished. In step S702, a mobile switching node, the MSC 101 sends a paging request about the UE 103 to the MME 102, with a service type indicator of "CS call". In step S703, the MME 102 finds out that a first indication with value of "Ultra card UE" shows that the UE 103 shares the subscriber number with another terminal device, and a second indication with value of "SMS only" shows that the terminal device does not support a circuit switching call function.

Therefore, in step S704, the MME 102 determines not to respond to the paging request, based on the first indication and based on the result of the operation of checking the second indication. Namely, the MME 102 ignores the paging request from the MSC 101, and suspends a reject response to the paging request.

If another UE (not shown in FIG. 7) with CS capability is also paged at the same time due to the same shared MSISDN, the MSC 101 will only receive a success response of the another UE. Therefore, an unnecessary MT CS call fail will be avoid, in an efficient way.

Figure 8:
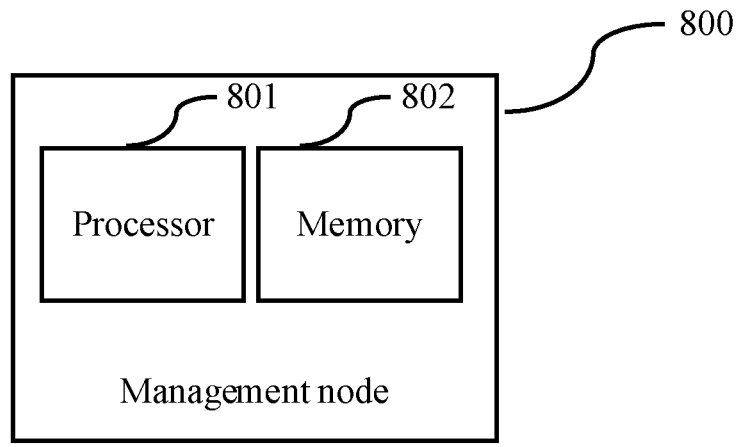
FIG. 8 is a block diagram showing the management node in accordance with embodiments of the present disclosure.

FIG. 8 is a block diagram showing the management node in accordance with embodiments of the present disclosure.

The management node 800 includes a processor 801; and a memory 802. The memory 802 contains instructions executable by the processor 802. The management node 800 is operative to perform the methods described above. For example, referring to FIG. 2, the management node 800 is operative to receive a first indication about whether the terminal device shares a subscriber number with another terminal device; check a second indication about whether the terminal device supports a circuit switching call function; receive a paging request about the terminal device; and determine whether to respond to the paging request, based on the first indication and based on a result of the operation of checking the second indication.

According to embodiments of the present disclosure, an efficient way, using an improved management node, is provided to improve CS call paging success rate.

The management node 800 is further operative to any other methods described above, such as further shown in FIGS. 3, 4, 5, 7.

For example, referring to FIG. 3 again, in embodiments of the present disclosure, the management node 800 is operative to determine (S301) not to respond to the paging request, if the first indication shows that the terminal device shares the subscriber number with another terminal device, and the result of checking the second indication shows that the terminal device does not support the circuit switching call function to determine.

Further, in embodiments of the present disclosure, the management node 800 is operative to determine (S302) to respond to the paging request, if the first indication shows that the terminal device shares the subscriber number with another terminal device, and the result of checking the second indication shows that the terminal device supports the circuit switching call function to determine.

Further, in embodiments of the present disclosure, the management node 800 is operative to determine (S303) to respond to the paging request, if the first indication shows that the terminal device does not share the subscriber number with another terminal device.

For example, referring to FIG. 4 again, in embodiments of the present disclosure, the management node is further operative to determine whether to page the terminal device, based on the result of checking the second indication.

Specifically, in embodiments of the present disclosure, the management node 800 is further operative to: determine (S401) to page the terminal device, if the result of checking the second indication shows that the terminal device supports the circuit switching call function; and determine (S402) not to page the terminal device, if the result of checking the second indication shows that the terminal device does not support the circuit switching call function.

In embodiments of the present disclosure, a response to the paging request comprises at least one of: reject response, if the first indication shows that the terminal device does not share the subscriber number with another terminal device, and the result of checking the second indication shows that the terminal device does not support the circuit switching call function; and success response, if the result of checking the second indication shows that the terminal device supports the circuit switching call function, and the terminal device accepts paging from the management node.

For example, referring to FIG. 5 again, in embodiments of the present disclosure, the management node is operative to receive the first indication from a subscriber server.

In embodiments of the present disclosure, the management node is operative to receive the first indication through an update location answer (as shown in S503) during an update location procedure.

For example, referring to FIG. 6 again, in embodiments of the present disclosure, the update location answer comprises a first information element as the first indication; and wherein the first information element comprises: a value of "Ultra Card User Equipment", indicating that the terminal device shares the subscriber number with another terminal device; or a value of "Normal User Equipment", indicating that the terminal device does not share the subscriber number with another terminal device.

For example, referring to FIG. 5 again, in embodiments of the present disclosure, the management node is operative to determine (as shown in S506) the second indication based on an information element "additional update type" of the terminal device, and a circuit-switched fallback (CSFB) configuration of the management node.

In embodiments of the present disclosure, the information element "additional update type" of the terminal device is received from the terminal device, through a combined attach/TAU request message during a combined attach/TAU procedure, wherein the TAU refers to tracking area update.

In embodiments of the present disclosure, an absence of the second indication indicates that the terminal device supports a circuit switching call function.

The processor 801 may be any kind of processing component, such as one or more microprocessor or microcontrollers, as well as other digital hardware, which may include digital signal processors (DSPs), special-purpose digital logic, and the like. The memory 802 may be any kind of storage component, such as read-only memory (ROM), random-access memory, cache memory, flash memory devices, optical storage devices, etc.

Figure 9:
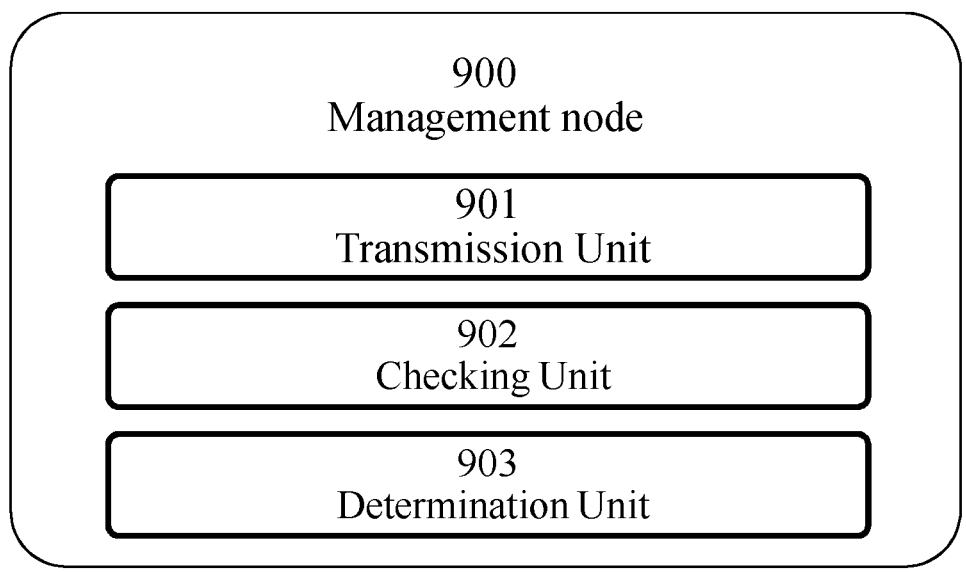
FIG. 9 is a schematic showing function units for the management node in accordance with embodiments of the present disclosure.

FIG. 9 is a schematic showing function units for the management node in accordance with embodiments of the present disclosure. As shown in FIG. 9, the management node 900 includes a transmission unit 901, configured to receive a first indication about whether the terminal device shares a subscriber number with another terminal device, and to receive a paging request about the terminal device; a checking unit 902, configured to check a second indication about whether the terminal device supports a circuit switching call function; and a determination unit 903, configured to determine whether to respond to the paging request, based on the first indication and based on a result of the operation of checking the second indication.

With function units as shown in FIG. 9, the management node may not need a fixed processor or memory. Any computing resource and storage resource may be arranged from at least one node device in the network. The introduction of function units may improve the usage efficiency of the network resources and the flexibility of the network.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 10:
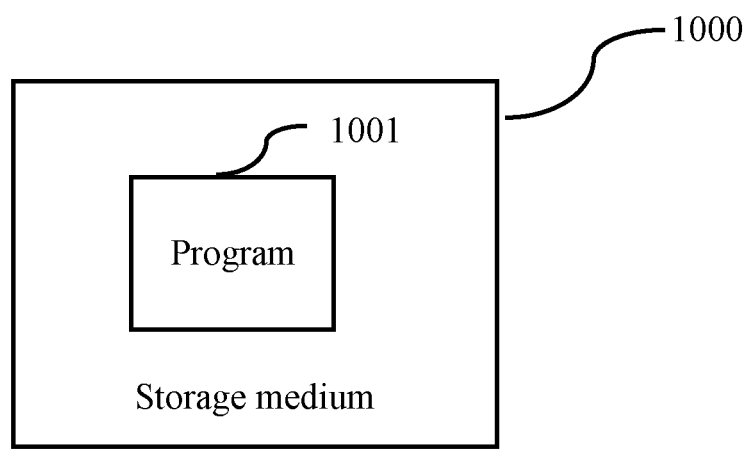
FIG. 10 is a block diagram showing a computer readable storage medium in accordance with embodiments of the present disclosure.

FIG. 10 is a block diagram showing a computer readable storage medium in accordance with embodiments of the present disclosure.

The computer readable storage medium 1000 has a computer program 1001 stored thereon. The computer program 1001 is executable by a device to cause the device to carry out the method described above, such as shown in FIGS. 2-4.

The computer readable storage medium 1000 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

Due to embodiments in the present disclosure, a success rate of circuit switching call may be improved in an efficient way. In the embodiments of the present disclosure, a management node, such as MME, is improved, and there is no need to modify other network nodes, such as MSC. Further, the latency, power consumption to support a CS call may be improved, since time and radio resources for the attempt of paging a terminal device are reduced, and thereby provide benefits such as, reduced user waiting time.

In general, the various exemplary embodiments of the present disclosure may be implemented in hardware or special purpose circuits, software, logic or any combination thereof. For example, some aspects may be implemented in hardware, while other aspects may be implemented in firmware or software that may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may include circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

The invention claimed is:

1. A method for a management node to page a terminal device, comprising:
receiving a first indication about whether the terminal device shares a subscriber number with another terminal device;
checking a second indication about whether the terminal device supports a circuit switching call function;

receiving a paging request about the terminal device; and determining whether to respond to the paging request, based on the first indication and based on a result of the operation of checking the second indication.

2. The method of claim 1, wherein determining whether to respond to the paging request comprises:

determining not to respond to the paging request, if the first indication shows that the terminal device shares the subscriber number with another terminal device, and the result of the operation of checking the second indication shows that the terminal device does not support the circuit switching call function.

3. The method of claim 1, wherein determining whether to respond to the paging request comprises:

determining to respond to the paging request, if the first indication shows that the terminal device shares the subscriber number with another terminal device, and the result of the operation of checking the second indication shows that the terminal device supports the circuit switching call function.

4. The method of claim 1, wherein determining whether to respond to the paging request comprises:

determining to respond to the paging request, if the first indication shows that the terminal device does not share the subscriber number with another terminal device.

5. The method of claim 1, further comprising:

determining whether to page the terminal device, based on the result of the operation of checking the second indication.

6. The method of claim 5, wherein determining whether to page the terminal device comprises at least one of:

determining to page the terminal device, if the result of the operation of checking the second indication shows that the terminal device supports the circuit switching call function; and determining not to page the terminal device, if the result of the operation of checking the second indication shows that the terminal device does not support the circuit switching call function.

7. The method of claim 1, wherein the first indication is received from a subscriber server.

8. The method of claim 1, wherein the second indication is determined, based on an information element "additional update type" of the terminal device, and a circuit-switched fallback (CSFB) configuration of the management node.

9. The method of claim 1, wherein the subscriber number comprises: a mobile station international subscriber directory number (MSISDN); and wherein terminal devices sharing the same subscriber number have different international mobile subscriber identification (IMSI), numbers.

10. A management node for use in a wireless communications network, the management node comprising:

a processor; and a memory, containing instructions executable by the processor;

wherein the management node is operative to:

receive a first indication about whether a terminal device shares a subscriber number with another terminal device;

check a second indication about whether the terminal device supports a circuit switching call function;

receive a paging request about the terminal device; and

<determine whether to respond to the paging request, based on the first indication and based on a result of the operation of checking the second indication.

11. The management node of claim 10, operative to determine not to respond to the paging request, if the first indication shows that the terminal device shares the subscriber number with another terminal device, and the result of checking the second indication shows that the terminal device does not support the circuit switching call function to determine.

12. The management node of claim 10, operative to determine to respond to the paging request, if the first indication shows that the terminal device shares the subscriber number with another terminal device, and the result of checking the second indication shows that the terminal device supports the circuit switching call function to determine.

13. The management node of claim 10, operative to determine to respond to the paging request, if the first indication shows that the terminal device does not share the subscriber number with another terminal device.

14. The management node of claim 10, further operative to determine whether to page the terminal device, based on the result of checking the second indication.

15. The management node of claim 14, further operative to:

determine to page the terminal device, if the result of checking the second indication shows that the terminal device supports the circuit switching call function; and determine not to page the terminal device, if the result of checking the second indication shows that the terminal device does not support the circuit switching call function.

16. The management node of claim 10, operative to receive the first indication from a subscriber server.

17. The management node of claim 16, operative to receive the first indication through an update location answer during an update location procedure.

18. The method of any of claim 10, operative to determine the second indication based on an information element "additional update type" of the terminal device, and a circuit-switched fallback (CSFB) configuration of the management node.

19. The management node of claim 10, wherein an absence of the second indication indicates that the terminal device supports a circuit switching call function.

20. A non-transitory computer readable storage medium having a computer program stored thereon, the computer program executable by a device to cause the device to carry out a method for a management node to page a terminal device, the method comprising:

receiving a first indication about whether the terminal device shares a subscriber number with another terminal device;

checking a second indication about whether the terminal device supports a circuit switching call function;

receiving a paging request about the terminal device; and determining whether to respond to the paging request, based on the first indication and based on a result of the operation of checking the second indication.

* * * * *